United States Patent [19]

Clark

[11] 4,433,735
[45] Feb. 28, 1984

[54] SPRAYER TRAILER, TILLAGE IMPLEMENT AND HITCH FOR ATTACHING IMPLEMENT TO TRAILER

[76] Inventor: Otho A. Clark, Rte. 1, Independence, Mo. 64050

[21] Appl. No.: 349,266

[22] Filed: Feb. 16, 1982

[51] Int. Cl.³ .......................................... A01B 59/043
[52] U.S. Cl. .................................. 172/443; 172/484; 172/248
[58] Field of Search ............... 172/248, 439, 443, 448, 172/478, 484, 675, 679, 680, 605; 280/415 A

[56] References Cited

U.S. PATENT DOCUMENTS

| | | | |
|---|---|---|---|
| 2,780,160 | 2/1957 | Harris | 172/248 |
| 2,785,614 | 3/1957 | Jensen | 172/448 X |
| 2,899,776 | 8/1959 | Arnold | 172/484 X |
| 3,347,564 | 10/1967 | Snoozy | 172/484 X |
| 3,428,335 | 2/1969 | Clark | 172/443 X |
| 3,716,253 | 2/1973 | Gniffke et al. | 172/248 X |
| 4,073,346 | 2/1978 | Groth et al. | 172/439 |
| 4,220,350 | 9/1980 | Hatcher | 172/248 X |

FOREIGN PATENT DOCUMENTS 1263379  3/1968  Fed. Rep. of Germany ...... 172/439

*Primary Examiner*—Richard T. Stouffer
*Assistant Examiner*—William H. Honaker
*Attorney, Agent, or Firm*—Schmidt, Johnson, Hovey & Williams

[57] ABSTRACT

An implement hitch has a cultivator carrier mounted on a sprayer trailer by a four point linkage actuated by a hydraulic cylinder to raise and lower a standard rigidly connected to the cultivator, there being a quick attach, three point pin-hook coupling between the carrier and the standard.

10 Claims, 5 Drawing Figures

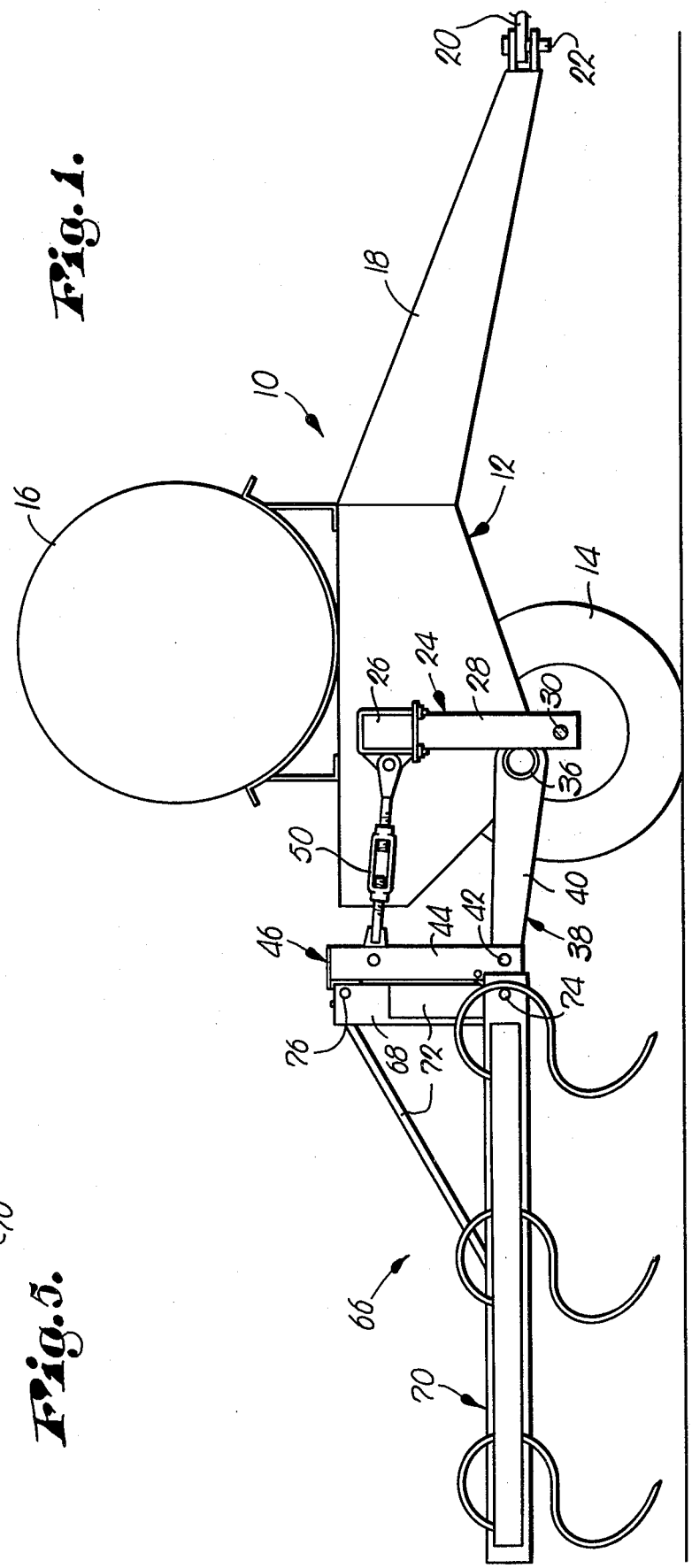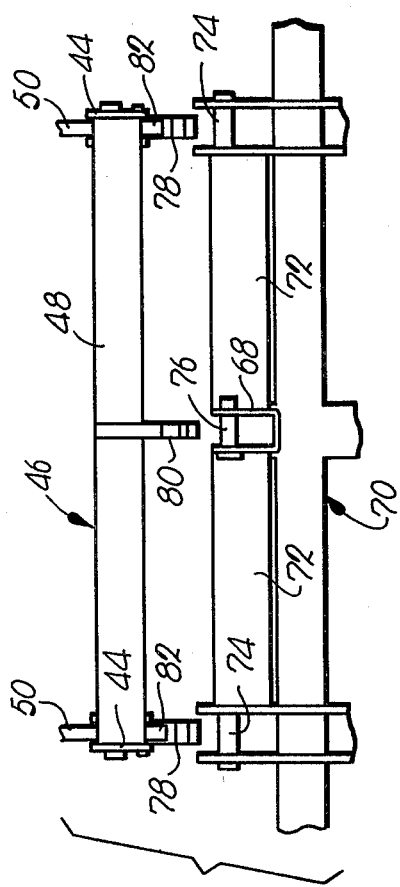

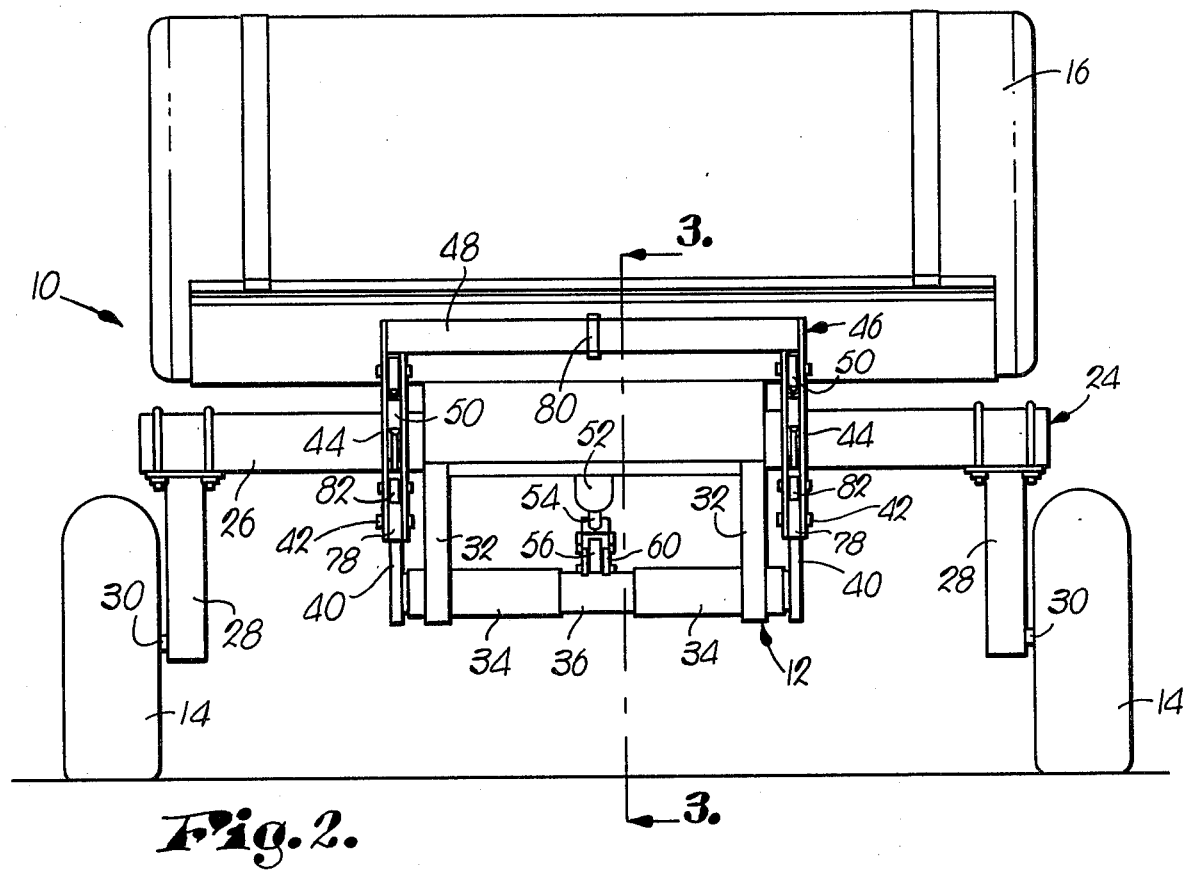
Fig. 2.
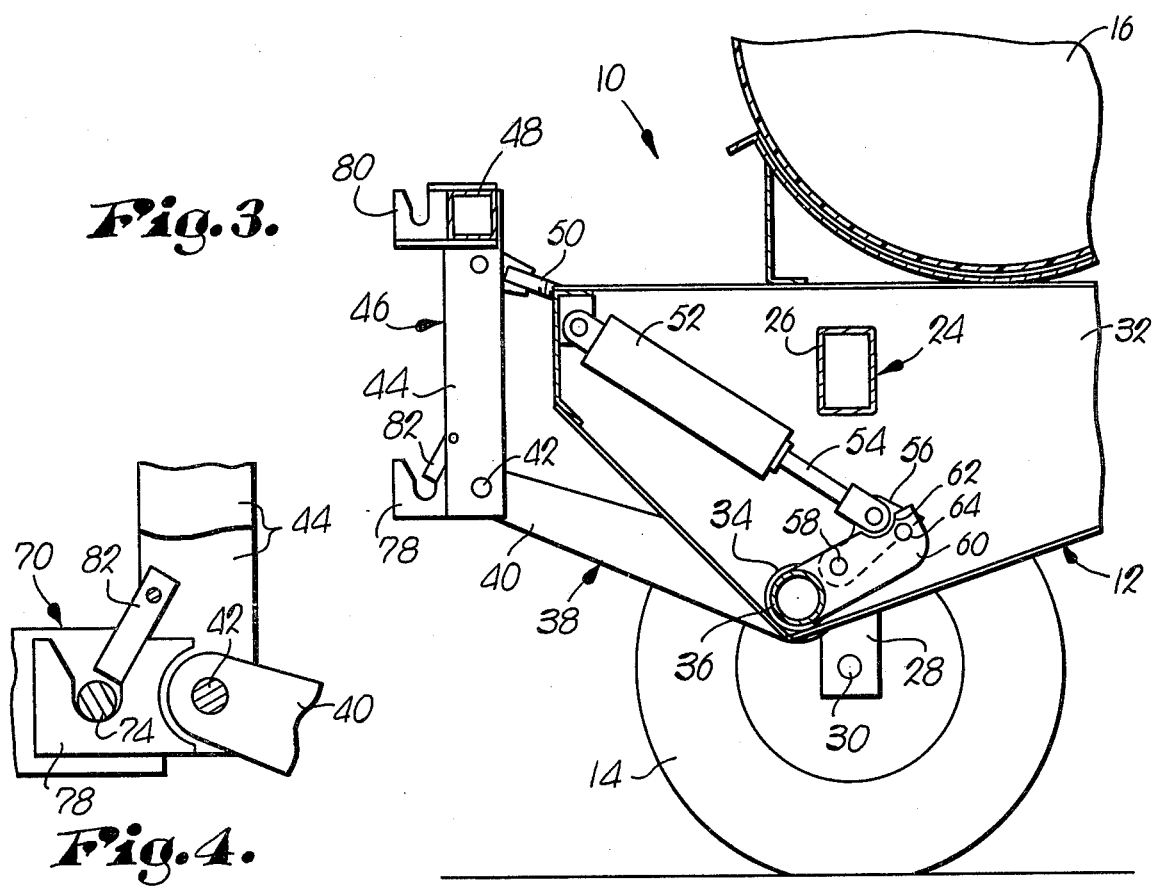
Fig. 3.
Fig. 4.

SPRAYER TRAILER, TILLAGE IMPLEMENT AND HITCH FOR ATTACHING IMPLEMENT TO TRAILER

Quite commonly in the farm implement field, fertilizers, herbicides and the like are sprayed or otherwise applied from a laterally extending, nozzled boom mounted on a wheeled trailer adapted to be pulled behind a tractor and supporting a supply tank for the liquid chemicals. Alternately, such materials are incorporated into the soil from a nozzled manifold on a cultivator or other tillage implement requiring two separate implements (trailer and cultivator) if both procedures are to be followed at different times and under differing conditions or user desires.

In accordance with my present invention the trailer and the tiller are easily and quickly connected and disconnected such that, after removal of the detachable boom assembly from the trailer and coupling the tillage implement therebehind, the two units are towed in tandem.

A three point pin-hook coupling is provided between an upstanding standard rigid to the cultivator and an upstanding carrier on the trailer. A cylinder powered, four point linkage, also adapted for use with the boom assembly, is provided between the carrier and the trailer such that the carrier and the standard may be reciprocated vertically.

In the drawings:

FIG. 1 is a side elevational view of a cultivator coupled behind a sprayer trailer through use of an implement hitch made pursuant to my present invention;

FIG. 2 is a rear view of the trailer, the tiller having been removed;

FIG. 3 is an enlarged fragmentary, partially raised view taken on line 3—3 of FIG. 2;

FIG. 4 is a fragmentary detailed view still further enlrged showing how one of the pins is locked in its hook; and FIG. 5 is a fragmentary plan view showing the pin-hook relationships and alignment just prior to coupling.

A trailer 10, having a chassis 12 carried by wheels 14, supports a supply tank 16 for liquid chemicals, such as fertilizers and herbicides. A tongue 18 may be connected with the drawbar 20 of a tractor (not shown) by a removable pin or bolt 22. The chassis 12 includes a U-shaped frame 24 having a crossbeam 26 from which depends legs 26 that receive axles 30 of the wheels 14.

The chassis 12 is also provided with a pair of horizontally spaced, upright arms 32 to which are secured a pair of tubular bushings 34, rotatably carrying a rock shaft 36 forming a part of a four point linkage 38. The linkage 38 includes a pair of horizontally spaced lower, vertically swingable links 40 rigid to and extending rearwardly from the shaft 36, having their rearmost ends connected by pivot pins 42 to the lower ends of legs 44 of a U-shaped carrier 46 provided with an upper, horizontal bight 48. Linkage 38 also includes a pair of horizontally spaced, vertically swingable, upper links 50 (in the nature of turnbuckles) pivotally interconnecting the crossbeam 26 and the legs 44.

A hydraulic cylinder 52, pivotally connected with the chassis 12, has its piston rod 54 pivotally connected to a short bar 56 that, in turn, has a pivotal attachment 58 to a crank 60 rigid to the shaft 36. The bar 56 has a notch 62 for receiving the proximal end of the rod 54 and the bar 56 has a notch for receiving a pin 64 on the crank 60.

A tillage implement 66 in the nature of a cultivator has a median upright standard 68 rigid to the upper, forward end of its framework 70 and suitably stabilized by bracing as at 72. A pair of lower, horizontally spaced cross pins 74 are provided on the framework 70 and a single upper pin 76 is provided on the standard 68.

Corresponding to the pins 74 are upwardly opening, rearwardly extending, pin-receiving hooks 78 rigid to the legs 44 and, corresponding to the pin 76, is an upwardly opening, rearwardly extending, pin-receiving hook 80 rigid to the bight 48 midway its ends. Each hook 78 has a pin-retaining lock or latch 82 swingable on its proximal leg 44 and normally disposed in its operating position by force of gravity.

When the pins 74 and 76 are in their hooks 78 and 80 respectively, the implement 66 may be raised and lowered by actuation of the cylinder 52 to rock the shaft 36 and swing the linkage 38. The links 50 may be adjusted so that the parallel carrier 46 and standard 68 travel along a rectilinear path of travel vertically. When raised (FIG. 3) the bar 56 abuts the pin 64. When lowered, the bar 56 swings freely as the implement 66 travels over uneven terrain, the extent of descent of the implement 66 being limited by the pin 64.

During use, chemicals from the tank 16 may be directed to an applicator (not shown) on the implement 66 for spraying or for introduction into the soil.

Upon detachment of the implement 66, a boom sprayer may be substituted, of the kind, for example, disclosed in my U.S. Pat. No. 4,106,700, in which event, such sprayer assembly will be provided with hooks of the type shown herein at 78 and 80.

I claim:

1. In combination with a sprayer trailer and a tillage implement, said sprayer trailer having a tongue at the normally forward end thereof provided with means for connecting the trailer to a towing vehicle, said implement being provided with framework, a hitch for attaching the implement to and behind the trailer comprising:

an implement carrier in the form of a single rigid frame member at the normally rear end of the trailer;

four point linkage directly interconnecting the trailer and the carrier;

power means interconnecting the linkage and the trailer for raising the carrier;

a standard mounted on the implement framework at the front of the latter; and three point coupling means directly connecting the carrier with the standard and framework.

2. The invention of claim 1, said coupling means including a number of transverse pins mounted on said framework and standard and a corresponding number of upwardly-opening, pin-receiving hooks mounted on said carrier.

3. The invention of claim 2, said coupling means including a pair of lower, laterally spaced pin-hook connections and a single, upper, median pin-hook connection.

4. The invention of claim 3, each lower coupling means having a releasable lock for holding each of its pins within its hook.

5. The invention of claim 3, there being a pair of horizontally spaced, vertically swingable, lower links pivotally interconnecting the trailer and the carrier and a pair of horizontally spaced, vertically swingable, upper links pivotally interconnecting the trailer and the carrier, said power means being operably connected with the lower links.

6. The invention of claim 3, there being a pair of horizontally spaced, vertically swingable, lower links pivotally interconnecting the trailer and the carrier and a pair of horizontally spaced, vertically swingable, upper links pivotally interconnecting the trailer and the carrier, said upper links being extensible for effecting rectilinear movement vertically of said carrier during swinging of the links.

7. The invention of claim 6, there being a rotatable rock shaft rigidly interconnecting the lower links, said power means being a hydraulic cylinder and piston rod assembly operably connected to said shaft for rocking the latter.

8. The invention of claim 7, each lower coupling means having a releasable lock for holding its pin within its hook.

9. The invention of claim 1, there being a pair of horizontally spaced, vertically swingable, lower links pivotally interconnecting the trailer and the carrier and a pair of horizontally spaced, vertically swingable, upper links pivotally interconnecting the trailer and the carrier, said power means being operably connected with the lower links.

10. The invention of claim 1, said trailer and the carrier each having a pair of upstanding legs, there being a pair of horizontally spaced, vertically swingable, lower links pivotally interconnecting the trailer and the carrier and a pair of horizontally spaced, vertically swingable, upper links pivotally interconnecting the legs of the trailer and the legs of the carrier, said upper links being extensible for effecting a parallel relationship between the legs of the carrier and the legs of the trailer.

* * * * *